US011203976B2

(12) United States Patent
Guardi et al.

(10) Patent No.: US 11,203,976 B2
(45) Date of Patent: *Dec. 21, 2021

(54) DIFFUSER CASE MIXING CHAMBER FOR A TURBINE ENGINE

(71) Applicant: Raytheon Technologies Corporation, Farmington, CT (US)

(72) Inventors: Vito Guardi, Stratford, CT (US); Christopher B. Lyons, West Hartford, CT (US); Nathan Snape, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/798,969

(22) Filed: Feb. 24, 2020

(65) Prior Publication Data

US 2020/0291858 A1 Sep. 17, 2020

Related U.S. Application Data

(62) Division of application No. 14/910,283, filed as application No. PCT/US2014/049334 on Aug. 1, 2014, now Pat. No. 10,612,469.

(Continued)

(51) Int. Cl.
*F02C 7/00* (2006.01)
*F02C 7/18* (2006.01)
(Continued)

(52) U.S. Cl.
CPC ............... *F02C 7/18* (2013.01); *F01D 5/18* (2013.01); *F01D 9/065* (2013.01); *F01D 25/14* (2013.01);
(Continued)

(58) Field of Classification Search
CPC .. F02C 7/18; F02C 7/185; F02C 7/141; F02C 9/18; F02C 6/08; F01D 5/18; F01D 5/081;
(Continued)

(56) References Cited

U.S. PATENT DOCUMENTS 3,768,921 A 10/1973 Brown et al.
3,777,489 A 12/1973 Johnson et al.
(Continued)

FOREIGN PATENT DOCUMENTS

FR 2897417 8/2007
GB 2299378 10/1996
KR 100694370 3/2007

OTHER PUBLICATIONS

International Search Report and Written Opinion for application No. PCT/US2014/049334 dated Nov. 20, 2014.
(Continued)

*Primary Examiner* — Edwin Kang
(74) *Attorney, Agent, or Firm* — Carlson, Gaskey & Olds, P.C.

(57) ABSTRACT

A turbine engine includes a compressor section, a combustor in fluid communication with the compressor section, and a turbine section in fluid communication with the combustor. Also included in the turbine engine is a mixing chamber. The mixing chamber is located between the compressor section and the combustor section and the mixing chamber is radially outward of a primary fluid flow path connecting the compressor section, the combustor section, and the turbine section.

8 Claims, 4 Drawing Sheets

Related U.S. Application Data

(60) Provisional application No. 61/862,276, filed on Aug. 5, 2013.

(51) Int. Cl.
| | | |
|---|---|---|
| *F01D 25/14* | (2006.01) | |
| *F01D 5/18* | (2006.01) | |
| *F02C 6/08* | (2006.01) | |
| *F01D 9/06* | (2006.01) | |
| *F02C 3/04* | (2006.01) | |
| *F02C 9/18* | (2006.01) | |
| *F23R 3/28* | (2006.01) | |

(52) U.S. Cl.
CPC .................. *F02C 3/04* (2013.01); *F02C 6/08* (2013.01); *F02C 7/185* (2013.01); *F02C 9/18* (2013.01); *F23R 3/283* (2013.01); *F23R 3/286* (2013.01); *F05D 2220/32* (2013.01); *F05D 2240/35* (2013.01); *F05D 2260/20* (2013.01); *Y02T 50/60* (2013.01)

(58) Field of Classification Search
CPC .......... F01D 5/082; F01D 9/065; F01D 25/14; F01D 25/12; F05D 2260/20; F05D 2260/213; F04D 29/542
See application file for complete search history.

(56) References Cited

U.S. PATENT DOCUMENTS

| | | | |
|---|---|---|---|
| 5,297,386 A * | 3/1994 | Kervistin | ................ F01D 11/24 60/226.1 |
| 5,403,156 A | 4/1995 | Arness et al. | |
| 5,632,141 A | 5/1997 | Sloop et al. | |
| 6,513,330 B1 | 2/2003 | Rice et al. | |
| 6,612,114 B1 | 9/2003 | Klingels | |
| 7,025,563 B2 | 4/2006 | Servadio et al. | |
| 7,062,918 B2 | 6/2006 | Walker et al. | |
| 8,162,605 B2 | 4/2012 | Alvanos et al. | |
| 10,677,161 B2 * | 6/2020 | Lyons | .................... F02C 7/185 |
| 2005/0188702 A1 | 9/2005 | Bachovchin et al. | |
| 2008/0112798 A1 | 5/2008 | Seltzer et al. | |
| 2008/0179837 A1 | 7/2008 | Ryan | |
| 2011/0088405 A1 * | 4/2011 | Turco | ...................... F01D 5/081 60/782 |
| 2013/0081373 A1 | 4/2013 | Mukhopadhyay et al. | |

OTHER PUBLICATIONS

International Preliminary Report on Patentability for Application No. PCT/US2014/049334 dated Feb. 18, 2016.
Supplementary European Search Report for Application No. 14833773.6 dated Mar. 14, 2017.
Escobar, Joe, Turbine Engine Compressor Sections Basic theory and operation, May 1, 2003.

* cited by examiner

DIFFUSER CASE MIXING CHAMBER FOR A TURBINE ENGINE

CROSS-REFERENCE TO RELATED APPLICATIONS

This application is a divisional of U.S. patent application Ser. No. 14/910,283 filed on Feb. 5, 2016. U.S. patent application Ser. No. 14/910,283 is a National Phase application of International Application No. PCT/US2014/049334 filed on Aug. 1, 2014. International Application No. PCT/US2014/049334 claims priority to U.S. Provisional Application No. 61/862,276 filed on Aug. 5, 2013.

STATEMENT REGARDING FEDERALLY SPONSORED RESEARCH OR DEVELOPMENT

This invention was made with government support under Contract No. FA8650-09-D-2923 awarded by the United States Air Force. The Government has certain rights in this invention.

TECHNICAL FIELD

The present disclosure relates generally to turbine engine structures, and more specifically to a diffuser case for a turbine engine.

BACKGROUND OF THE INVENTION

Gas turbine engines are generally known and, when used on an aircraft, typically include a fan delivering air into a bypass duct and into a compressor section. Air from the compressor section is passed downstream into a combustion section where it is mixed with fuel and ignited. Products of this combustion pass downstream over turbine rotors driving them to rotate.

Turbine rotors drive compressor and fan rotors. Historically, the fan rotor was driven at the same speed as a turbine rotor. More recently, it has been proposed to include a gear reduction between the fan rotor and a fan drive turbine. With this change, the diameter of the fan has increased dramatically and a bypass ratio, or volume of air delivered into the bypass duct compared to a volume delivered into the compressor has increased. With this increase in bypass ratio, it becomes more important to efficiently utilize the air that is delivered into the compressor.

One way to increase the efficiency of the use of this air is to increase the pressure at the exit of a high pressure compressor. This elevated pressure results in a high temperature increase at the exit of the high pressure compressor. The elevated temperature at the exit of the high pressure compressor is known in the art as $T_3$.

In order to cool the high pressure compressor, as well as other turbine engine components with elevated temperatures, existing designs direct cool air from other portions of the engine, such as a bypass flowpath, onto the components that are desired to be cooled. In some instances the air being utilized in this manner is too cool relative to the temperature of the component, and the air will not provide proper cooling unless it is conditioned to be the correct temperature.

SUMMARY OF THE INVENTION

A turbine engine according to an exemplary embodiment of this disclosure, among other possible things includes a compressor section, a combustor in fluid communication with the compressor section, a turbine section in fluid communication with the combustor, and a mixing chamber, the mixing chamber is located between the compressor section and the combustor section and the mixing chamber is radially outward of a primary fluid flow path connecting the compressor section, the combustor section, and the turbine section.

In a further embodiment of the foregoing turbine engine, the mixing chamber is defined by an inner diffuser case wall, an outer diffuser case wall, and a mixing chamber wall.

In a further embodiment of the foregoing turbine engine, the mixing chamber wall isolates the mixing chamber from a diffuser chamber, and the mixing chamber wall includes a seal having local penetrations such that diffuser air can travel from the diffuser into the mixing chamber.

In a further embodiment of the foregoing turbine engine, the mixing chamber wall isolates said mixing chamber from a diffuser chamber, and the mixing chamber wall includes a seal having local penetrations such that diffuser air can travel from said diffuser into the mixing chamber.

In a further embodiment of the foregoing turbine engine, the seal is a finger seal.

In a further embodiment of the foregoing turbine engine, the seal is a sheet metal seal.

In a further embodiment of the foregoing turbine engine, the outer diffuser case wall includes an opening for connecting to a bypass airflow passage such that bypass air enters the mixing chamber through the opening.

In a further embodiment of the foregoing turbine engine, the secondary flow passage directs air from the mixing chamber to at least one turbine engine component.

In a further embodiment of the foregoing turbine engine, the turbine engine component is one of a tangential on board injection system and a compressor on board injection system.

In a further embodiment of the foregoing turbine engine, air entering the mixing chamber from the bypass airflow passage is overcooled air.

A turbine engine according to an exemplary embodiment of this disclosure, among other possible things includes a compressor section, a combustor in fluid communication with the compressor section, a turbine section in fluid communication with the combustor, and a mixing chamber defined within a diffuser case strut, the diffuser case strut is connected to a turbine engine case via an inner diffuser case wall and the diffuser case strut is connected to an radially inward engine support structure via at least an inner skirt, a cooled air inlet tube extending from the turbine engine case into the mixing chamber such that air entering the cooled air inlet tube is deposited in the mixing chamber.

In a further embodiment of the foregoing turbine engine, the diffuser case strut is located within a primary fluid flow path connecting the compressor section, the combustor section, and the turbine section.

In a further embodiment of the foregoing turbine engine, wherein an aft edge of the diffuser case strut is a mixing chamber wall and isolates the mixing chamber from ambient air in the combustor section.

In a further embodiment of the foregoing turbine engine, the mixing chamber wall includes at least one metering hole operable to allow ambient air from an adjacent engine component to enter the mixing chamber and mix with air deposited from the inlet tube.

In a further embodiment of the foregoing turbine engine, the cooled air inlet tube includes an inlet opening for connecting to a bypass airflow passage such that bypass air enters the mixing chamber through the inlet tube, the inlet opening is on an opposite end of the inlet tube relative to an outlet of the cooled air inlet tube, the outlet of the cooled air inlet tube is in the mixing chamber.

In a further embodiment of the foregoing turbine engine, the mixing chamber further includes an outlet opening operable to direct mixed air out of the mixing chamber.

In a further embodiment of the foregoing turbine engine, the outlet opening directs air from the mixing chamber to at least one turbine engine component.

In a further embodiment of the foregoing turbine engine, the turbine engine component is one of a tangential on board injection system and a compressor on board injection system.

A turbine engine according to an exemplary embodiment of this disclosure, among other possible things includes a compressor section, a combustor in fluid communication with the compressor section, a turbine section in fluid communication with the combustor, and a mixing chamber defined within a diffuser case, the diffuser case is located between the compressor section and the combustor section and the mixing chamber is at least partially defined by a diffuser case strut.

In a further embodiment of the foregoing turbine engine, the mixing chamber includes a first opening operable to receive air from a heat exchanger, at least one second metered opening operable to receive mixing air from an adjacent turbine engine section, and an outlet In a further embodiment of the foregoing turbine engine, the mixing chamber is isolated from a fluid flowing through a primary fluid flow path connecting the compressor section, the combustor section, and the turbine section.

A method for cooling air according to an exemplary embodiment of this disclosure, among other possible things includes receiving overcooled air in a mixing chamber, the mixing chamber is the mixing chamber is located between a compressor section and a combustor section and the mixing chamber is radially outward of a primary fluid flow path connecting the compressor section, the combustor section, and a turbine section of a turbine engine, receiving ambient air in the mixing chamber, the ambient air is warm relative to the overcooled air, mixing the overcooled air and the ambient air in said mixing chamber such that a desired air temperature is achieved; and distributing mixed air to a turbine engine cooling system.

In a further embodiment of the foregoing method, the step of distributing mixed air to a turbine engine cooling system comprises distributing air to at least one of a tangential on board injection system, a compressor on board injection system, and an exit rim of the compressor section.

These and other features of the present invention can be best understood from the following specification and drawings, the following of which is a brief description.

DETAILED DESCRIPTION OF AN EMBODIMENT

Figure 1:
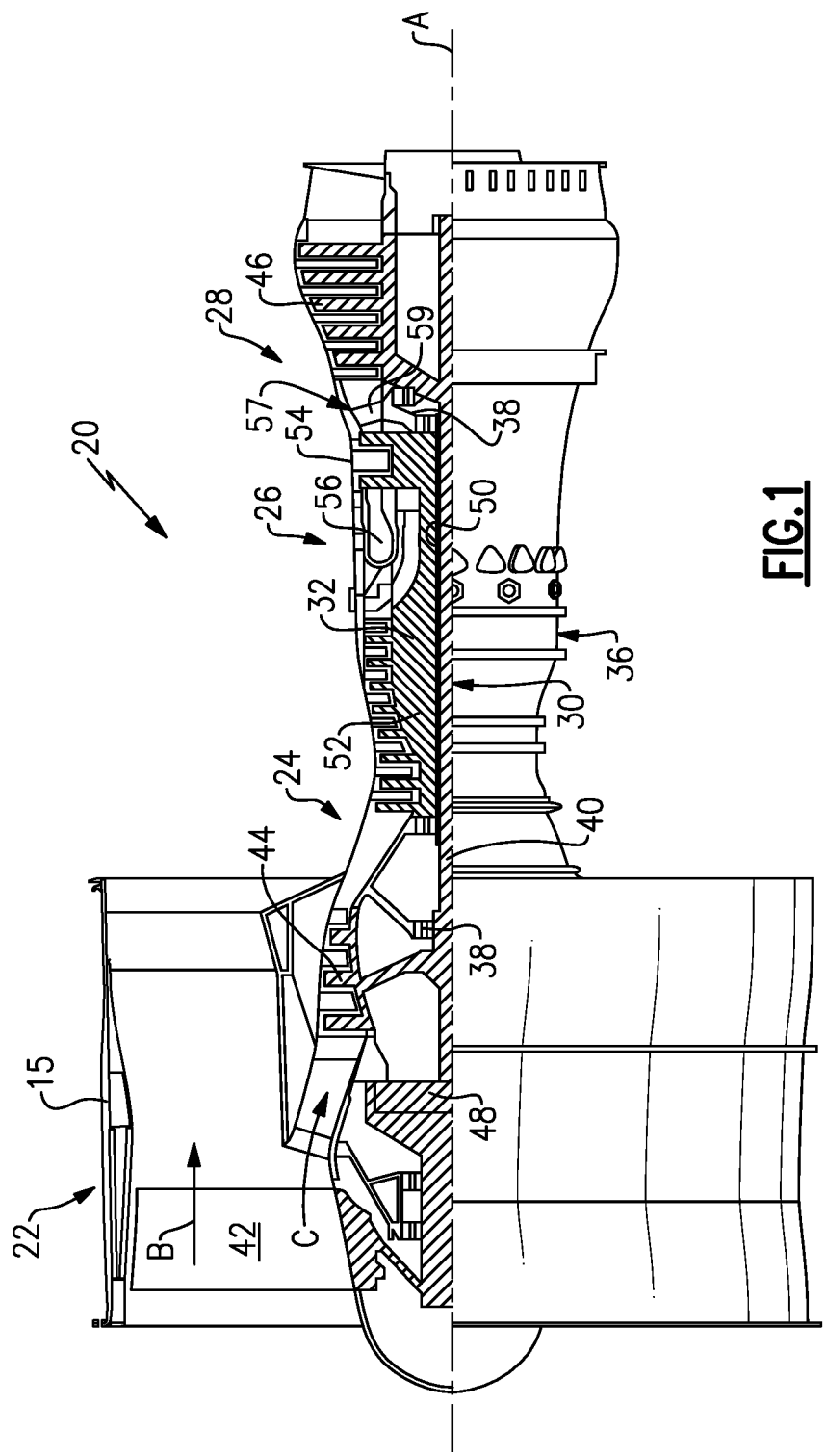
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about five (5). In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second.

Figure 2:
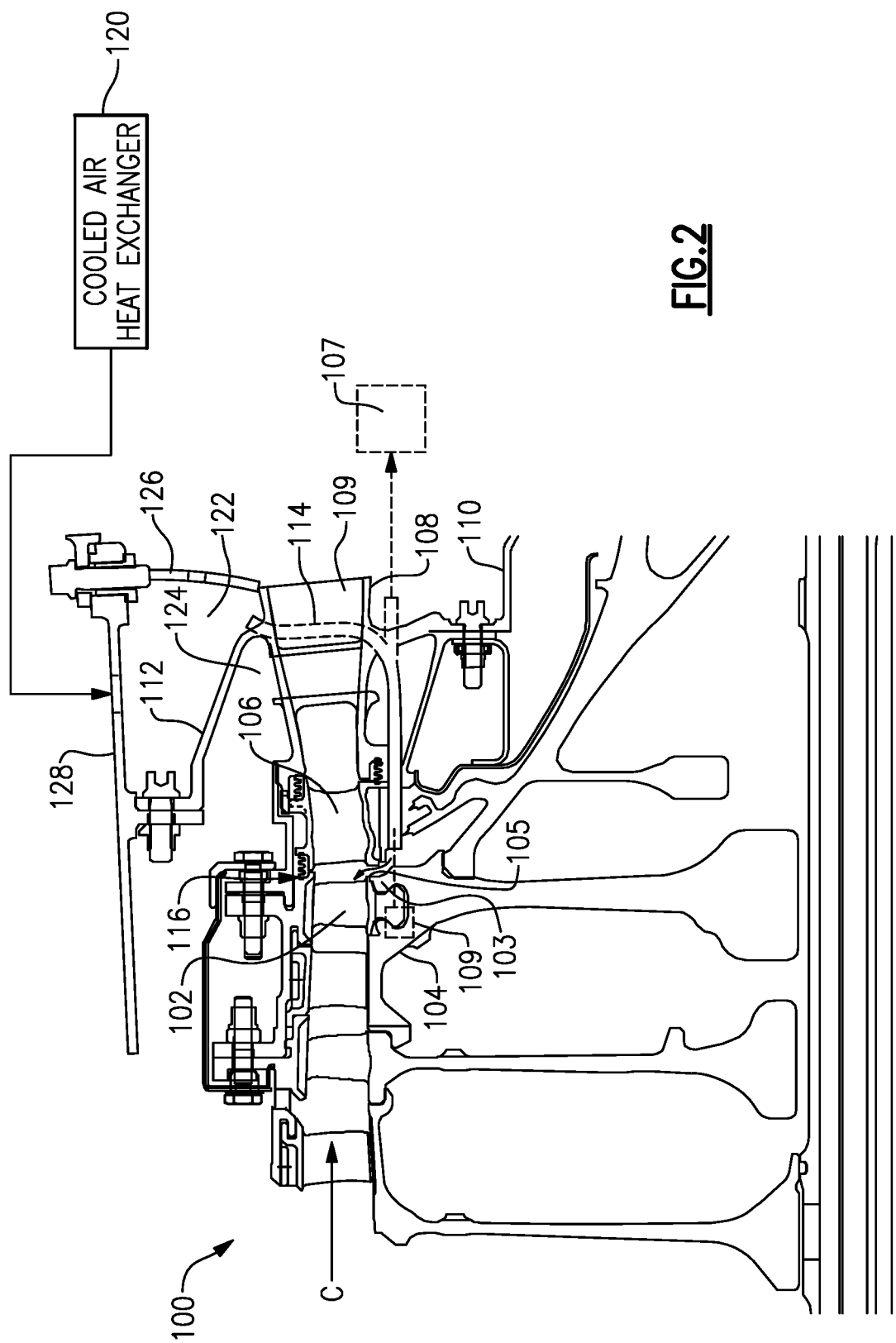
FIG. 2 schematically illustrates a sectional view of the turbine engine of FIG. 1.

FIG. 2 is a sectional view 100 of the turbine engine 20 of FIG. 1, illustrating a high pressure compressor portion 102. The compressor portion 102 includes rotor blades 103 connected to rotor disks 104. An exit guide vane 106 is positioned within the gas flow path C immediately aft of the compressor portion 102 and alters flow characteristics of a gas flow exiting the compressor portion 102, prior to the gas flow entering a combustor 56 (illustrated in FIG. 1).

Immediately aft of the exit guide vane 106 and positioned in the gas flow path C is an inner diffuser case 108 that mechanically supports the structures of the turbine engine 20. The inner diffuser case 108 is connected on a radially interior edge to a turbine engine support structure via an inner skirt 110 and is connected to a turbine engine case structure on a radially outer edge via a support cone 112. Integrally connected with the inner diffuser case 108 is an inner diffuser case strut 109. The inner diffuser case strut 109 further includes a flow path opening aligned with the gas flow path C, thereby allowing gasses in the flow path C to pass through the inner diffuser case strut 109. The inner diffuser case 108 is also connected on the radially outer edge to the turbine engine case structure via a second wall 126.

Immediately superior of the support cone 112 is an upper mixing chamber 122. The upper mixing chamber 122 is a cavity defined by the support cone, the second wall 126 and the turbine engine case 128. In some alternate examples, the upper mixing chamber 122 can be replaced via a mixing chamber disposed within the diffuser strut.

The upper mixing chamber 122 receives cooled air from a cooled air heat exchanger 120, and allows the cooled air to mix with ambient air, such as air from the combustor section 26, to achieve a desired temperature. In one example, the cooled air received in the upper mixing chamber is overcooled air.

The upper mixing chamber 122 and the cooled air heat exchanger 120 are collectively referred to as a cooled air system, and the cooled air from the cooled air system is distributed to turbine engine components that need cooling. In one example, the cooled air is provided to a Tangential On Board Injection (TOBI) system 107. In another example, the cooled air is provided to an exit rim 105 of the compressor section 24. In another example the cooled air is provided to a Compressor On Board Injection (COBI) system 109.

As a result of the above described $T_3$ temperatures, the gas exiting the compressor portion 102 is at an extremely high temperature, and subjects the aftmost rotor blade attachment 103 and the compressor hub to temperatures elevated beyond the standard temperature capabilities of the respective parts. By providing a cooled air mixing chamber 122, cooling air can be mixed with ambient air and conditioned to a proper cooling temperature prior to the cooled air being sent to the rotor blade's attachment 103, the spacer arm, and the compressor hub, thereby allowing the $T_3$ temperatures to be utilized.

Figure 3:
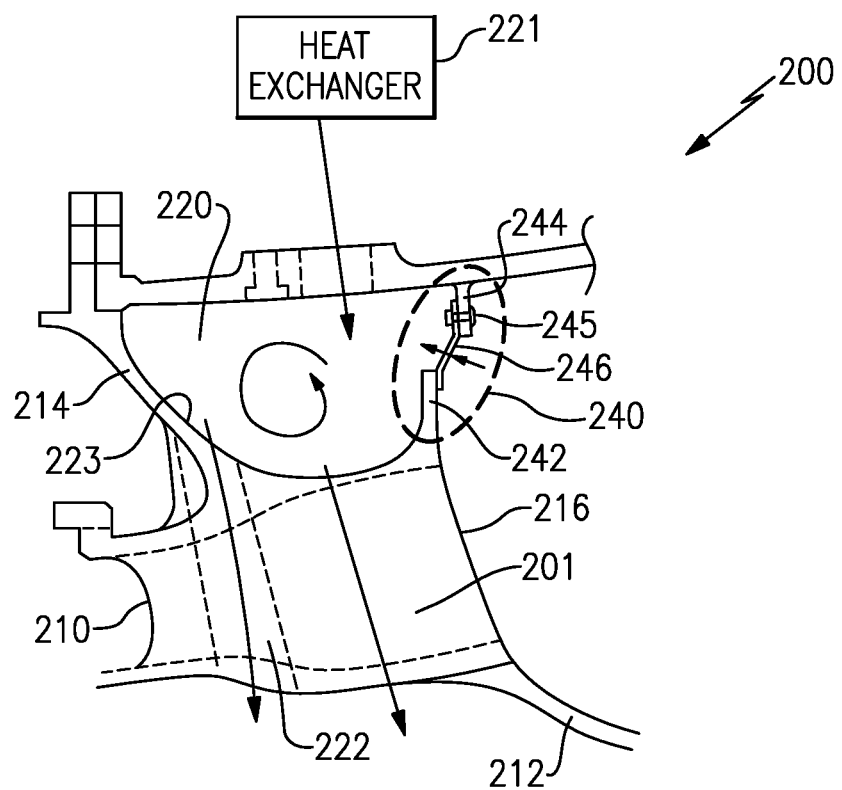
FIG. 3 schematically illustrates a first example diffuser case.

FIG. 3 illustrates a first example inner diffuser case 200 in greater detail. As described and illustrated with regards to FIG. 2, the inner diffuser case 200 includes an inner diffuser case strut 201 having fore edge 210 and an aft edge 216. An inner skirt 212 connects the diffuser strut 201 to a radially inner support structure of the turbine engine 20. Similarly, a support cone 214 structure connects the inner diffuser case strut 201 to the turbine engine case. An upper mixing chamber 220 is defined radially outward of the inner diffuser case 200 and receives cooled air from a heat exchanger 221 located elsewhere in the turbine engine 20.

A second wall 240 connects the aft edge 216 of the strut 201 to the turbine engine case. The second wall 240 is formed from a flange 242 extending radially outward from the strut 201 and a flange 244 extending radially inward from the turbine engine case. The two flanges 242, 244 define a gap that is sealed via a finger seal 246. The finger seal 246 includes multiple local perforations or gaps that allow ambient air from the combustor section 26 to enter the upper mixing chamber 220. The local perforations, or gaps, are metered (sized) to limit the amount of airflow into the upper mixing chamber 220, thereby ensuring that a desired mixing of air from a heat exchanger 221 and air from the combustor section 26 is achieved.

In the illustrated example, the finger seal 246 is fastened to the outer flange 244 via a fastener 245. The finger seal 246 is maintained in place against the radially inner flange 242 by a naturally occurring spring pressure of the seal material. The sealing is further aided by a pressure differential between the compressor section 24 and the combustor section 26. The pressure differential also ensures that air from the upper mixing chamber 220 does not exit via the metering holes into the combustor section 26.

The inner diffuser case strut 201 includes at least one air feed passage 222. The air feed passage 222 has an opening 223 at the upper mixing chamber 220 that allows mixed air from the upper mixing chamber 220 to enter the air feed passage 222. The air feed passage 222 then directs the mixed air to a turbine engine cooling system, such as a TOBI system, or any other cooling system.

Figure 4:
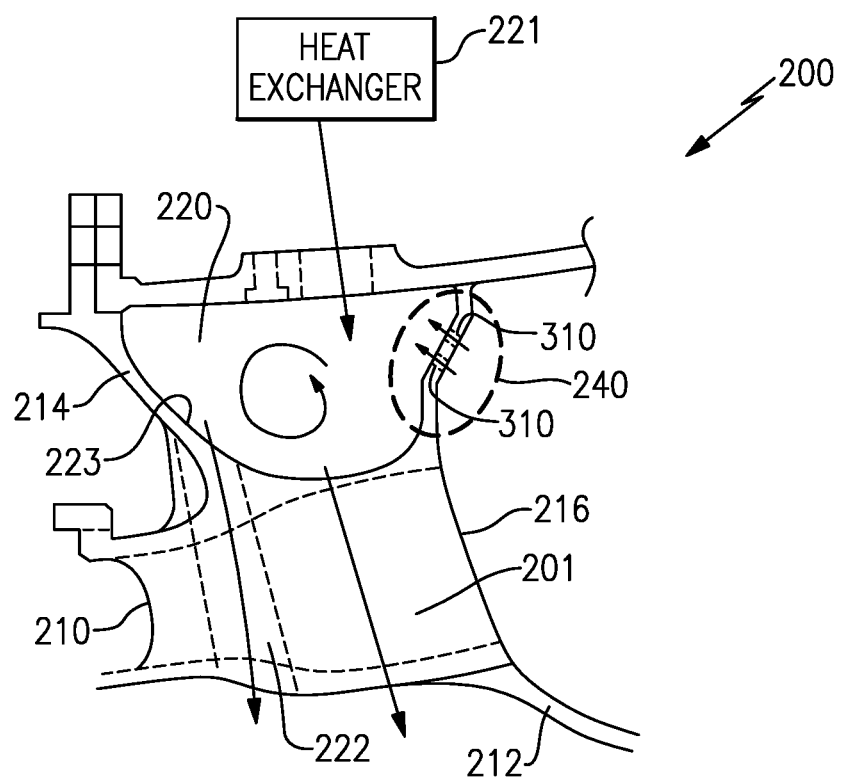
FIG. 4 schematically illustrates a second example diffuser case.

With continued reference to FIG. 3, and with like numerals indicating like elements, FIG. 4 illustrates an alternate configuration for defining the upper mixing chamber 220. As with the example of FIG. 3, the inner diffuser case 200 includes an inner diffuser case strut 201 having fore edge 210 and an aft edge 216. An inner skirt 212 connects the diffuser strut 201 to a radially inner support structure of the turbine engine 20. Similarly, a support cone 214 structure connects the inner diffuser case strut 201 to the turbine engine case. An upper mixing chamber 220 is defined radially outward of the inner diffuser case 200 and receives cooled air from a heat exchanger 221 located elsewhere in the turbine engine 20.

A second wall 240 connects the aft edge 216 of the strut 201 to the turbine engine case and separates the upper mixing chamber 220 from an adjacent combustor section 26. The second wall 240 is integrally formed with the strut 201 and is connected to the turbine engine case via any known fastening means. In alternate examples, the second wall 240 can be integrally formed with the turbine case and connected to the strut 201 via any known fastening means, or formed separately and connected to each of the strut 201 and the turbine engine case. Further included within the second wall 240 are multiple metered holes 310. The metered holes 310 are sized to permit a desired airflow from the combustor section 26 to enter the upper mixing chamber 220.

In order to utilize the solid second wall 240 without a gap (as in the example of FIG. 3), consideration must be given to the thermal expansion and contraction of the various components. As such, the material from which the second wall 240 is constructed should be selected by a designer to accommodate for various expansions and contractions. The example of FIG. 4 is particularly suited to turbine engine environments where the strut and turbine case have similar thermal expansion and contraction rates, as such a design would include minimal thermal variance between the strut 201 and the turbine engine case.

Once the air from the combustor section 26 enters the upper mixing chamber, it is mixed with the air from the heat exchanger 221 to generate the desired mixed air for the corresponding cooling systems. Air is provided from the upper mixing chamber 220 to the cooled components or cooling systems in the same manner as is described above with regards to the example of FIG. 3.

Figure 5:
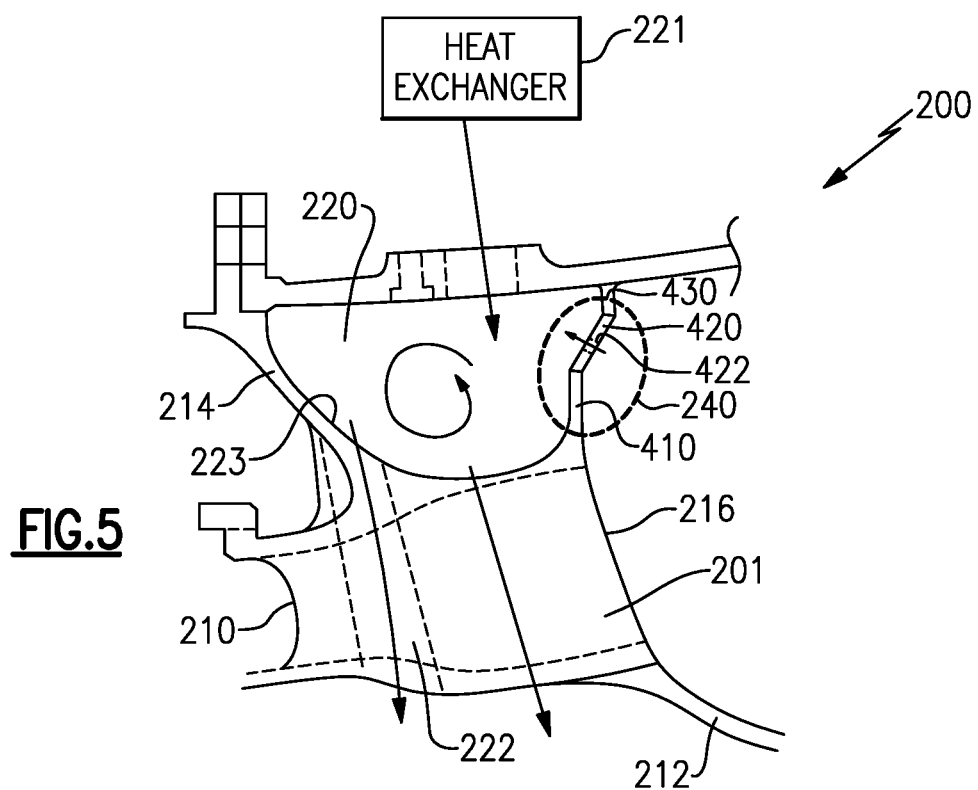
FIG. 5 schematically illustrates a third example diffuser case.

With continued reference to FIGS. 3 and 4, and with like numerals indicating like elements, FIG. 5 illustrates a second alternate configuration for defining the upper mixing chamber 220. The example of FIG. 5 is identical to the examples of FIGS. 3 and 4 with the exception of the second wall 240. In the alternate example of FIG. 5, the second wall 240 is formed of three sections 410, 420, 430. A radially inward section 410 is integrally formed with the strut 201 and a radially outward section 430 is formed as part of the turbine engine case. Each of the inner and outer sections 410, 430 are formed of rigid materials. Typically these materials will be the same material as the strut 201 or the turbine engine case. The middle section 420, is joined to each of the inner and outer sections 410, 430 and is formed of a flexible material, such as a sheet metal. The flexible material allows for the second wall 240 to accommodate varied thermal expansion and contraction rates between the components by flexing and unflexing the middle section 420 as necessary. The flexible middle segment 420 further includes multiple holes 422. The holes 422 are metered to allow air from the combustor section 26 into the upper mixing chamber 220 as described above with regard to the holes 310 in the example of FIG. 4, and achieve the same affect.

While no specific connection means is illustrated for connecting the flexible middle section 420 to the inner section 410 and the outer section 430, it is understood that one of skill in the art would be able to utilize any number of standard connection schemes to achieve the illustrated embodiment.

Figure 6:
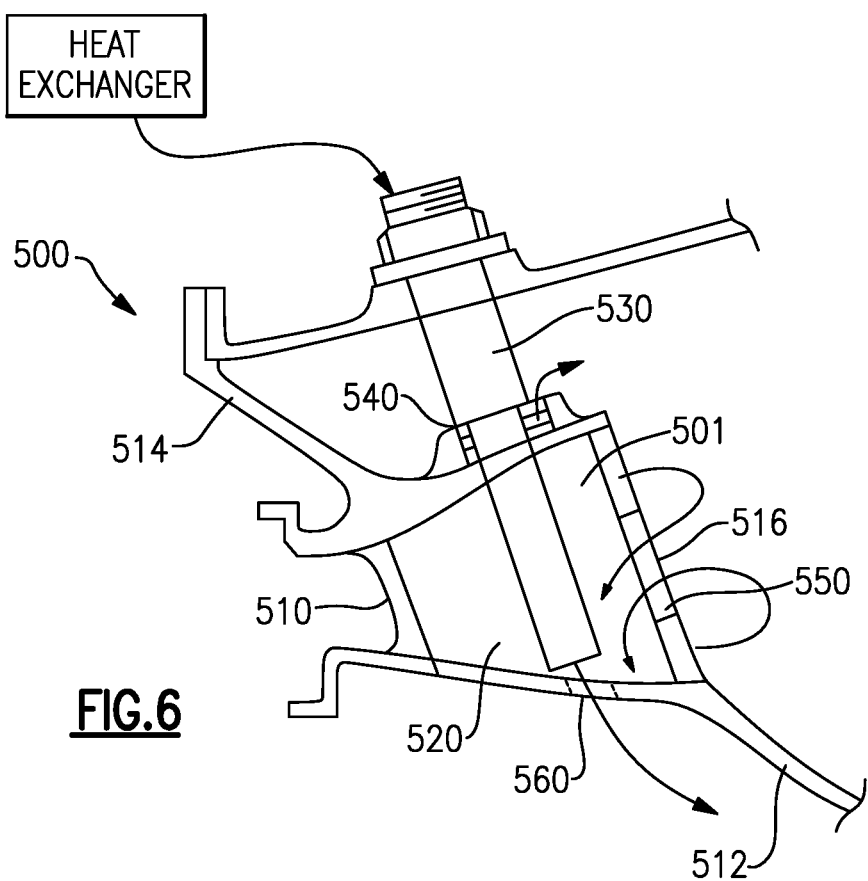
FIG. 6 schematically illustrates a fourth example diffuser case.

In some turbine engines 20 it is desirable to locate a mixing chamber internal to a strut 501. FIG. 6 illustrates an inner diffuser case 500 in one such example. The inner diffuser case 500 includes an inner diffuser case strut 501 having a fore edge 510 and an aft edge 516. An inner skirt 512 connects the diffuser strut 501 to a radially inner support structure of the turbine engine 20. Similarly, a support cone 514 structure connects the inner diffuser case strut 501 to the turbine engine case. A mixing chamber 520 is defined within the strut 501 and receives cooled air from a heat exchanger 521 located elsewhere in the turbine engine 20 via a cooled air inlet tube 530.

The cooled air inlet tube 530 protrudes through the inner diffuser case 500 and enters the strut 501 via an opening 540. The opening 540 is sealed around the cooled air inlet tube 530 via a ring seal. In alternate configurations, the opening 540 can be sealed around the tubing via another known seal type.

The aft edge 516 of the strut 501 includes at least one hole 550 that allows air from the combustor section 26 to enter the mixing chamber 520. Once mixed, the air in the mixing chamber 520 is passed out of the mixing chamber 520 via an opening 560 that connects the mixing chamber 520 to a turbine engine cooling system.

While each of the above embodiments describes receiving air into the mixing chambers from a heat exchanger system and a combustor section, it is understood that any appropriate source of air can be utilized, and the designs are not limited to the specifically enumerated locations.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine comprising:
   a compressor section;
   a combustor section in fluid communication with the compressor section;
   a turbine section in fluid communication with the combustor section; and
   a mixing chamber defined within a diffuser case strut, wherein the diffuser case strut is connected to a turbine engine case via an inner diffuser case wall and the diffuser case strut is connected to a radially inward engine support structure via at least an inner skirt;
   a cooled air inlet tube extends from said turbine engine case into said mixing chamber such that air entering the cooled air inlet tube is deposited in the mixing chamber.

2. The turbine engine of claim 1, wherein the diffuser case strut is located within a primary fluid flow path connecting the compressor section, the combustor section, and the turbine section.

3. The turbine engine of claim 1, wherein an aft edge of the diffuser case strut is a mixing chamber wall and isolates the mixing chamber from ambient air in the combustor section.

4. The turbine engine of claim 3, wherein said mixing chamber wall includes at least one metering hole operable to allow ambient air from an engine component adjacent to the mixing chamber wall to enter the mixing chamber and mix with the air deposited from said inlet tube.

5. The turbine engine of claim 4, wherein said cooled air inlet tube includes an inlet opening for connecting to a bypass airflow passage such that air from the bypass airflow passage enters the mixing chamber through the inlet tube, wherein the inlet opening is on an opposite end of the inlet tube relative to an outlet of said cooled air inlet tube, wherein said outlet of said cooled air inlet tube is in said mixing chamber.

6. The turbine engine of claim 1, wherein said mixing chamber further comprises an outlet opening operable to direct mixed air out of the mixing chamber.

7. The turbine engine of claim 6, wherein said outlet opening directs the mixed air from the mixing chamber to at least one turbine engine component.

8. The turbine engine of claim 7, wherein said turbine engine component is one of a tangential on board injection system and a compressor on board injection system.

* * * * *